US005864093A

United States Patent [19]

Hecock et al.

[11] Patent Number: 5,864,093

[45] Date of Patent: Jan. 26, 1999

[54] ELECTRICAL GROUND CONNECTOR ASSEMBLY

[75] Inventors: J. Edwin Hecock; Jeffrey P. Wenger, both of Wauseon, Ohio

[73] Assignee: E & J Demark, Inc., Wauseon, Ohio

[21] Appl. No.: 865,199

[22] Filed: May 29, 1997

Related U.S. Application Data

[60] Provisional application No. 60/018,588 May 31, 1996.

[51] Int. Cl.[6] .......... H02G 15/02

[52] U.S. Cl. .......... 174/78; 174/87; 439/98

[58] Field of Search .......... 174/78, 7, 75 R, 174/87; 439/98, 99; 403/202, 206, 211, 213, 266, 268, 396

[56] References Cited

U.S. PATENT DOCUMENTS

| | | | |
|---|---|---|---|
| 937,130 | 10/1909 | Williams | 403/213 |
| 1,001,054 | 8/1911 | Lawrence | 439/863 |
| 1,597,169 | 8/1926 | Taylor | 403/206 |
| 1,693,848 | 12/1928 | Kyle | 403/268 |
| 1,849,186 | 3/1932 | Grau et al. | 403/202 |
| 2,107,835 | 2/1938 | Pierce | 439/100 |
| 2,167,799 | 8/1939 | Donald | 403/211 |
| 3,060,257 | 10/1962 | Spurgeon | 174/7 |
| 3,060,258 | 10/1962 | Spurgeon | 174/7 |
| 3,200,190 | 8/1965 | Forney, Jr. | 174/78 X |
| 3,446,910 | 5/1969 | Curtiss et al. | 174/78 X |
| 4,227,034 | 10/1980 | van Rijswijck | 174/7 |
| 4,316,050 | 2/1982 | Bergmark | 174/7 |
| 4,557,409 | 12/1985 | Hecock et al. | 227/147 |
| 5,188,187 | 2/1993 | Mumper | 327/178 |

*Primary Examiner*—Kristine Kincaid
*Assistant Examiner*—Chau N. Nguyen
*Attorney, Agent, or Firm*—MacMillan, Sobanski & Todd, LLC

[57] ABSTRACT

An electrical ground connector assembly for providing a fast, secure, moisture-resistant ground connection without using special tools. The electrical ground connector assembly includes a ground rod and a cap having an tapered rod chamber for the ground rod. The cap also includes at least one wire hole adjacent the tapered rod chamber at the bottom of the cap for receiving a ground wire. The wire hole is preferably at an angle of approximately six degrees with respect to the tapered rod chamber and merges with or intersects the rod chamber. In installation, the ground wire is inserted into the wire hole through the bottom of the cap. The upper end of the ground rod is forced into the rod cavity of the cap by any suitable manner, such as hammering the cap down over the ground rod. As the upper end of the ground rod reaches the end of the rod cavity and the ground wire extending into the cavity, it contacts and wedges itself into mechanical and electrical contact therewith. Alternatively, the ground rod can first be driven into the ground, and then the ground wire and the cap can be assembled on the ground rod.

12 Claims, 2 Drawing Sheets

ELECTRICAL GROUND CONNECTOR ASSEMBLY

CROSS-NOTING TO RELATED APPLICATIONS

This application is a non-provisional application of provisional application Ser. No. 60/018,588 filed May 31, 1996.

BACKGROUND OF THE INVENTION

1. Field of the Invention

The invention relates generally to the field of electrical conductors, and in particular, to the field of devices with which an electrical grounding rod is driven into the ground.

2. Related Art

Various conventional devices have been developed for sinking an electrical ground wire into the earth to establish contact with the electrically conductive earth.

Typically, the ground rod should be installed near the ground wire and the base of the pole. Usually, the rod is driven its full length into the ground. After being driven in place, the ground rod should have a resistance of less than 25 ohms. Then, the ground wire is wrapped around the mounting hardware bolt and the mounting hardware is tightened firmly to assure a continuing bond.

However, none of the prior art devices succeed in achieving a secure connection between the ground wire and ground rod with any degree of simplicity of structure or procedure. In addition, the prior art devices frequently require the use of complicated tools and a significant amount of time in assembly. Finally, none of the prior art devices provide a moisture resistant connection between the ground wire and the ground rod.

SUMMARY OF THE INVENTION

It is an object of the invention to provide an electrical ground connector assembly that insures a fast secure connection between the ground wire and the ground rod without the need of special tools.

It is another object of the invention to provide an electrical ground connector device that provides a moisture resistant connection between the ground wire and the ground rod.

It is yet another object of the invention to provide an electrical ground connector assembly capable of accommodating multiple ground wires and ground rods of different sizes.

To achieve these and other objects, the electrical ground connector assembly comprises a ground rod and a cap having a top and a bottom. The bottom of the cap includes an opening that forms a tapered rod chamber capable of receiving the ground rod. The tapered rod chamber has a diameter larger than a diameter of the ground rod at the bottom of the cap and a diameter smaller than the diameter of the ground rod at the top of the cap. The cap includes at least one wire hole capable of receiving a wire. At least one wire hole is positioned adjacent the opening of the cap and extends upward into the cap at an angle with respect to the tapered rod chamber, preferably approximately six degrees. A moisture-resistant, compression contact is made between the wire and the ground rod when the electrical ground connector assembly is driven into the ground and the cap is driven upon the rod.

These and other aspects and advantages of the invention are described or apparent from the following detailed description of the preferred embodiments and appended drawings wherein like reference numbers refer to the same element, feature or component.

BRIEF DESCRIPTION OF THE DRAWINGS

The preferred embodiments are described with reference to the drawings in which.

DETAILED DESCRIPTION OF THE PREFERRED EMBODIMENTS

Figure 1:
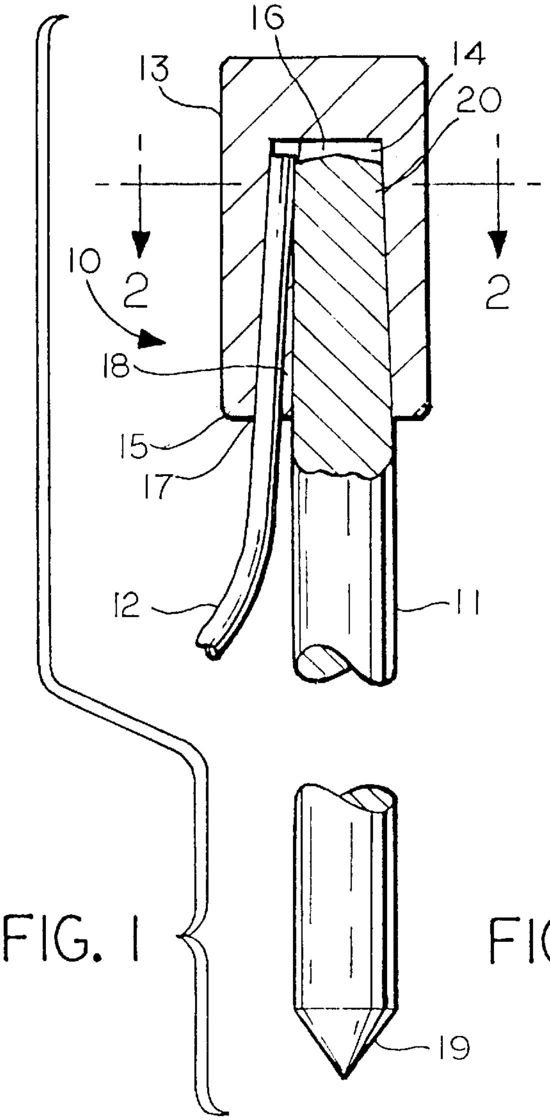
FIG. 1 an elevational view of the electrical ground connector assembly according to a preferred embodiment of the invention.
Figure 2:
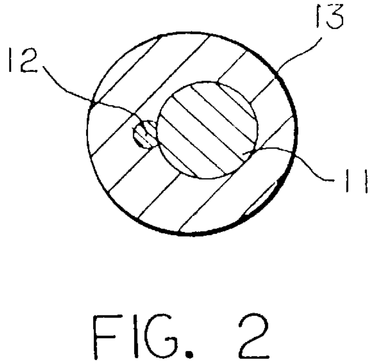
FIG. 2 shows a cross sectional view of the electrical ground connector assembly taken along lines 2—2 of FIG. 1.

FIG. 1 shows an elevation view of the electrical ground connector assembly 10 and FIG. 2 shows a cross sectional view of the electrical ground connector assembly 10 taken along lines 2—2 of FIG. 1 according to a preferred embodiment of the invention. The electrical ground connector assembly 10 includes a ground rod 11, an electrical ground wire or conductor 12 and a cap 13.

The cap 13 can be made of any suitably electrically conductive material, such as copper, brass or galvanized steel. The cap 13 may be made by casting, machining, forging, cold forming or any other means known by those skilled in the art. The cap 13 is preferably cylindrical in shape with a diameter of approximately 1.125 inches and a length of approximately 2.000 inches, but it should be appreciated that the cap 13 may be fabricated in any desirable shape.

The cap 13 has a rod chamber or rod cavity 14 at the bottom 15 terminating at a seat portion 16 within the cap 13. It should be appreciated that the rod chamber 14 may be of any suitable diameter and size to receive and accommodate a ground rod of corresponding diameter and size. The rod chamber 14 is tapered such that the rod chamber 14 has a diameter that is larger than the diameter of the ground rod 11 at the bottom 15 of the cap 13 and a diameter that is smaller than the diameter of the ground rod 11 towards the seat portion 16 of the cap 13.

At the bottom 15 of the cap 13, a wire hole 17 is positioned adjacent the rod chamber 14 and is sized to receive the wire 12. It should be appreciated that the wire hole 17 may be of different size and diameter to receive and accommodate a ground wire of corresponding size and diameter. A thin wall 18 is disposed between the wire hole 17 and the rod chamber 14 at the bottom 15 of the cap 13. However, the thickness of the thin wall 18 diminishes along a lateral dimension of the rod chamber 14 because the wire hole 17 is at an angle, preferably approximately six degrees, with respect to the rod chamber 14. In this manner, the wire hole 17 intersects or radially overlaps the rod chamber 14 before reaching the seat portion 16.

The ground rod 11 preferably has a tapered driving point 19 for insertion into the ground by means known to those skilled in the art. The ground rod 11 also includes an upper end 20 with a diameter smaller than the diameter at the bottom 15 of the rod cavity 14 and larger than the diameter at the seat portion 16 of the rod cavity 14. The ground rod 11 can be made of any suitably electrically conductive material, such as copper, brass or galvanized steel. The ground rod 11 may be made by casting, machining, forging, cold forming or any other means known by those skilled in the art. The ground rod 13 is preferably cylindrical in shape with a diameter of approximately 0.625 inches, but it should be appreciated that the ground rod 11 may be fabricated in any desirable shape which is complementary in shape to the rod cavity 14.

Figure 3:
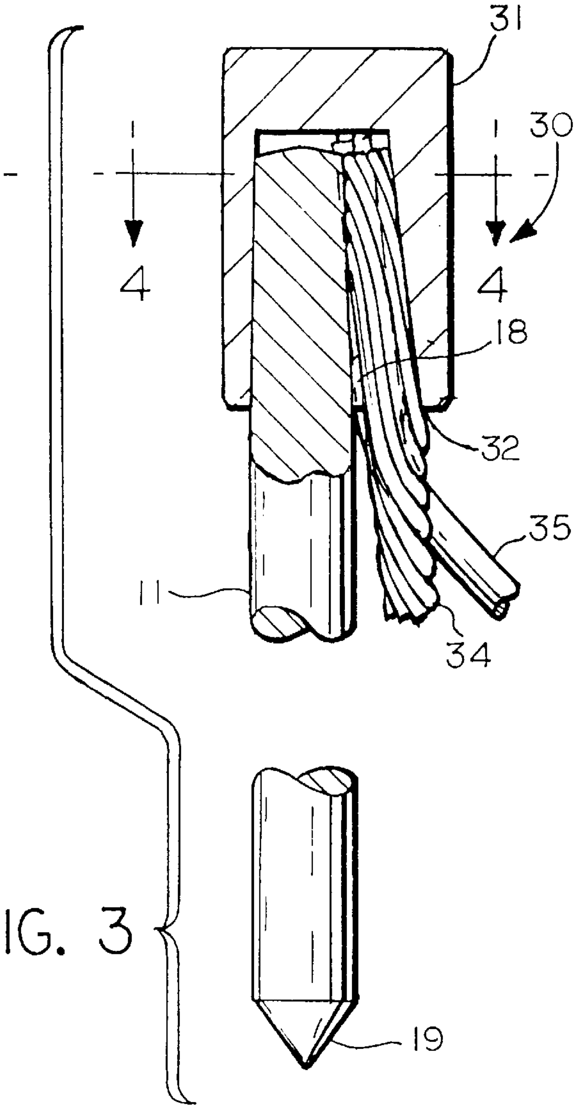
FIG. 3 shows an elevational view of the electrical ground connector assembly according to another prefer embodiment of the invention.
Figure 4:
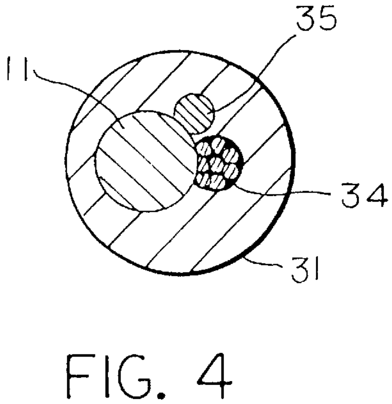
FIG. 4 shows a cross sectional view of the electrical ground connector assembly taken along lines 4—4 of FIG. 3.

FIG. 3 shows an elevation view of the electrical ground connector assembly 30 and FIG. 4 shows a cross sectional view of the electrical ground connector assembly 30 taken along lines 4—4 of FIG. 3 according to another preferred embodiment of the invention.

Figure 5:
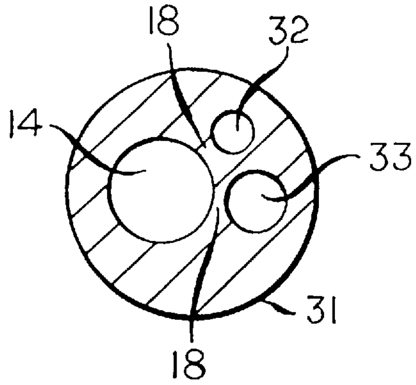
FIG. 5 shows a bottom view of the cap of the electrical ground connector assembly of FIG. 3.

In this preferred embodiment, the electrical ground connector assembly 30 is identical to the electrical ground connector assembly 10 of the first preferred embodiment, except that the cap 31 contains a plurality of wire holes or cavities 32, 33 capable of receiving a plurality of ground wires 34, 35, as shown in FIG. 5.

In installation, one end of the ground wire 12 is inserted into the wire hole 17, 32, 33 through the bottom 15 of the cap 13 and extends into the rod cavity 14. The upper end 20 of the ground rod 11 is forced into the rod cavity 14 of the cap 13 by any suitable means, such as hammering the cap down over the ground rod 11. When the ground rod 11 contacts the internal walls of the rod cavity 14, the internal walls of the rod cavity 14 are forced outward. As the internal walls expand from the force of the ground rod 11, the thin wall 18 separating the rod cavity 14 and the wire hole 17, 32, 33 closes onto the ground wire 12 providing a secure mechanical and electrical contact by compression between the ground wire 12 and the ground rod 11 (FIGS. 2 and 4). Because the top of the cap 13 is closed and the ground wire 12 is inserted into the bottom 15 of the cap 13, a moisture resistant, secure compression contact is formed between the ground wire 12 and the ground rod 11. Alternatively, the ground rod 11 can first be driven into the ground, and then the ground wire 12 and cap 13 can be assembled on the ground rod 11 as previously described.

While this invention has been described in conjunction with specific embodiments, it is evident that many alternatives, modifications and variations will be apparent to those skilled in the art. Accordingly, the preferred embodiments of the invention as set forth herein are intended to be illustrative, rather than limiting. Various changes may be made without departing from the spirit and scope of the invention as defined in the following claims.

What is claimed is:

1. An electrical ground connector assembly, comprising:

a ground rod having a lower end and an upper end; and a cap having a top and a bottom, the bottom including an opening forming a tapered rod chamber capable of receiving said upper end of said ground rod, said cap including at least one wire hole for receiving a wire and positioned adjacent the tapered rod chamber, a wall between the at least one wire hole and the tapered rod chamber, the at least one wire hole having an angle with respect to the tapered rod chamber such that a thickness of the wall separating the at least one wire hole and the tapered rod chamber decreases along a lateral dimension of the tapered rod chamber, wherein a compression contact is made between the wire and the upper end of said ground rod when the upper end of said ground rod is forced into the tapered rod chamber of said cap.

2. The electrical ground connector assembly according to claim 1, wherein the angle of the at least one wire hole with respect to the tapered rod chamber is approximately six degrees.

3. The electrical ground connector assembly according to claim 1, wherein the tapered rod chamber has a diameter larger than a diameter of said ground rod at the bottom of said cap and a diameter smaller than the diameter of said ground rod at the top of said cap.

4. The electrical ground connector assembly according to claim 1, wherein said cap is made of aluminum material.

5. The electrical ground connector assembly according to claim 1, wherein the at least one wire hole radially intersects the tapered rod chamber.

6. A ground connector, comprising:

a ground rod; and a cap having a closed top and an open bottom, the open bottom forming a rod cavity capable of receiving said ground rod, said cap including at least one wire cavity adjacent the rod cavity and being capable of receiving a wire, said cap also including a wall disposed between the at least one wire cavity and the rod cavity; the at least one wire cavity has an angle with respect to the rod cavity such that a thickness of the wall decreases along a lateral dimension of the rod cavity, wherein a moisture resistant compression contact between the wire and said ground rod is made when said ground rod is forced into the rod cavity of said cap.

7. The ground connector according to claim 6, wherein the angle is approximately six degrees.

8. The ground connector according to claim 6, wherein the at least one wire cavity radially intersects the rod cavity.

9. An electrical ground connector assembly, comprising:

a ground rod; and a cap having a first end and a second end, the second end including a rod cavity having internal walls capable of receiving said ground rod, said cap including a plurality of wire cavities, each wire cavity capable of receiving a wire and being positioned adjacent the rod cavity, a wall disposed between each wire cavity and the rod cavity, each wire cavity having an angle with respect to the rod cavity such that a thickness of the wall decreases along a lateral dimension of the rod cavity, wherein the internal walls of the rod cavity expand outwardly causing the wall separating the wire and the rod cavity to form a compression contact between the wire and the ground rod when said ground rod is forced into the rod cavity of said cap.

10. The electrical ground connector assembly according to claim 7, wherein the angle of each wire cavity with respect to the rod cavity is approximately six degrees.

11. The electrical ground connector assembly according to claim 9, wherein the rod cavity has a diameter larger than a diameter of said ground rod at the second end of said cap and a diameter smaller than the diameter of said ground rod at the first end of said cap.

12. The electrical ground connector assembly according to claim 9, wherein at least one of the plurality of wire cavities radially intersects the rod cavity.

* * * * *